(12) United States Patent
van Medevoort et al.

(10) Patent No.: US 9,314,949 B2
(45) Date of Patent: Apr. 19, 2016

(54) PLANAR MEMBRANE MODULE PREPARATION

(75) Inventors: Jolanda van Medevoort, Ede (NL); Jan Breen, Delft (NL); Leonardus Antonius Maria Brouwers, Delft (NL)

(73) Assignee: Nederlandse Organisatie voor toegepast-natuurwetenschappelijk onderzoek TNO, Delft (NL)

( * ) Notice: Subject to any disclaimer, the term of this patent is extended or adjusted under 35 U.S.C. 154(b) by 822 days.

(21) Appl. No.: 13/390,490

(22) PCT Filed: Aug. 13, 2010

(86) PCT No.: PCT/NL2010/050508
§ 371 (c)(1),
(2), (4) Date: Mar. 21, 2012

(87) PCT Pub. No.: WO2011/019278
PCT Pub. Date: Feb. 17, 2011

(65) Prior Publication Data
US 2012/0168369 A1 Jul. 5, 2012

(30) Foreign Application Priority Data

Aug. 14, 2009 (EP) .................................... 09167886
Jan. 6, 2010 (EP) .................................... 10150188

(51) Int. Cl.
*B29C 45/14* (2006.01)
*B01D 63/08* (2006.01)
(Continued)

(52) U.S. Cl.
CPC ........ *B29C 45/14336* (2013.01); *B01D 63/084* (2013.01); *B01D 65/003* (2013.01);
(Continued)

(58) Field of Classification Search
CPC ............. B01D 63/084; B01D 2313/04; B01D 2313/08; B01D 65/003; B01D 63/081; B29C 45/0053; B29C 45/14336; B29C 45/006; B29C 2031/14; B29C 2031/755; B29C 2031/18; F28F 21/065; F28F 3/086; Y10T 29/4935; Y10T 29/4998
USPC ...................... 210/231, 321.75, 321.84, 335; 29/890.03, 527.1; 264/DIG. 48, DIG. 76
See application file for complete search history.

(56) References Cited

U.S. PATENT DOCUMENTS

| 5,429,742 | A | 7/1995 | Gutman et al. |
| 5,922,200 | A | 7/1999 | Pearl et al. |
| 2005/0242030 | A1 | 11/2005 | Lausch et al. |
| 2008/0251440 | A1* | 10/2008 | Saito et al. ..................... 210/230 |

FOREIGN PATENT DOCUMENTS

| EP | 0 005 536 A2 | * 11/1979 |
| EP | 0039291 | 11/1981 |

(Continued)

OTHER PUBLICATIONS

English translation of European Patent Application No. 0 039 291 A1 (Nov. 1981).*
International Search Report for PCT/NL2010/050508, mailed Nov. 15, 2010.

*Primary Examiner* — John Kim
(74) *Attorney, Agent, or Firm* — Patterson Intellectual Property Law, P.C.; James R. Cartiglia; Timothy L. Capria

(57) ABSTRACT

The invention is directed to methods for preparing a planar membrane module, a planar membrane module obtainable by said methods, methods for preparing a heat exchanging module, and a heat exchanging module obtainable by said methods. In one aspect the method of the invention comprises:—providing a solid state planar membrane;—injection molding a potting material into one or more potting frames for supporting said membrane;—assembling, preferably by hot pressing, the one or more potting frames with the solid state planar membrane, thereby forming a membrane frame;—optionally providing a spacer at least at one side of the planar membrane; and—joining a stack of said membrane frames in a gastight manner to form a planar membrane module, said joining comprising welding of potting material.

19 Claims, 2 Drawing Sheets

(51) Int. Cl.
  B01D 65/00 (2006.01)
  B29C 45/00 (2006.01)
  F28F 3/08 (2006.01)
  F28F 21/06 (2006.01)
  B29L 31/14 (2006.01)
  B29L 31/18 (2006.01)
  B29L 31/00 (2006.01)

(52) U.S. Cl.
  CPC .......... *B29C45/006* (2013.01); *B29C 45/0053* (2013.01); *F28F 3/086* (2013.01); *F28F 21/065* (2013.01); *B01D 2313/04* (2013.01); *B01D 2313/08* (2013.01); *B29L 2031/14* (2013.01); *B29L 2031/18* (2013.01); *B29L 2031/755* (2013.01); *Y10T 29/4935* (2015.01); *Y10T 29/4998* (2015.01)

(56) References Cited

FOREIGN PATENT DOCUMENTS

| | | |
|---|---|---|
| EP | 0662341 | 7/1995 |
| JP | 06218240 A | 8/1994 |
| JP | 2002355514 A | 12/2002 |
| JP | 2003071456 A | 3/2003 |
| JP | 2007100997 | 4/2007 |
| JP | 2009090223 A | 4/2009 |
| WO | 200075082 | 12/2000 |
| WO | 2006019616 | 2/2006 |
| WO | 2010127818 A1 | 11/2010 |

* cited by examiner

A

B

A

B

C

PLANAR MEMBRANE MODULE PREPARATION

The invention describes methods for preparing a planar membrane module, a planar membrane module obtainable by said methods, methods for preparing a heat exchanging module, and a heat exchanging module obtainable by said methods.

Many industries apply processes that use membranes to separate (components from) fluids and/or gases. Representatives of such processes are for example microfiltration, ultra filtration, reverse osmosis, electro dialysis, diffusion dialysis, gas separation, (emulsion) pertraction, membrane distillation and pervaporation. Other processes in which membranes can be applied include chemical (catalytic) reactions/conversions in membrane modules and the production of energy from differences in salinity of water flows by reversed electro dialysis or pressure retarded osmosis.

The membrane in such membrane processes may vary in structure (porous/non-porous) and may vary in material (organic/inorganic). The membrane is using differences in physical and/or chemical properties between the membrane and permeating/transported components to accomplish a particular separation and transport on component level. Transport through the membrane takes place when a driving force is applied to the compounds/components in the feed. The driving force is for example a (vapour) pressure difference, electrical potential or a concentration (or activity) difference across the membrane. In many cases, also selectivity is important.

A membrane module is a device where for example separation of or a chemical reaction between compounds is accomplished due to a specific driving force through the membrane from the one phase to the other on opposite sides of the membrane. This membrane module achieves gas/liquid, gas/gas or liquid/liquid mass transfer without dispersion of one phase within another. The membrane represents an interface and can be defined as a perm selective barrier between two or more (non) homogeneous phases. Some of the important advantages of membrane modules in contrast to conventional dispersed phase contactors are for example: no flooding at high flow rates, no unloading at low flow rates, absence of emulsions, and no density difference between fluids required. They reduce the volume of equipment and offer more interfacial area in non-dispersive contact across a membrane. The membrane should be attentively chosen to enable as much as possible higher values of the mass transfer coefficient. A membrane module typically has two or more inlets and two or more outlets, in to contrast e.g. a filter module which has only one inlet and one filtered outlet and wherein the filter residue is blocked by the filter and captured in the filter module.

Membranes used to accomplish these separations have been fabricated in various geometries, such as planar sheet, spiral wound sheet, tubular and hollow fibres. The membrane geometry is usually dictated by the nature of the separation that is to be effected and the limitations of membrane production facilities. In order to maximise the membrane area per unit volume, a multitude of membranes are usually included in a membrane module. A number of planar membrane frames can for instance be stacked using assembling means such as screws, bolts, seals, and/or adhesives. Such assembling means typically have low chemical resistance.

The inventors were faced with the problem that under special conditions, such as high temperatures and/or contact with chemicals, the conventional planar membrane modules do not perform satisfactory. On the other hand, hollow fibre membrane modules are available that exhibit better temperature resistance and chemical inertia. However, these hollow fibre membrane modules are much more expensive, have limited applications, and suffer from difficult flow characteristics around the hollow fibres. Moreover, planar membranes are much more abundant, and are therefore more easily applicable.

Object of the invention is therefore to provide methods for producing a planar membrane module, having broad applicability and being relatively cheap, which membrane module combines good chemical resistance with high temperature resistance.

The inventors found that this object can be met by providing a method for preparing a planar membrane module wherein the potting is injection moulded and different membrane frames are combined by fusion.

Accordingly, in a first aspect the invention is directed to a method for preparing a planar membrane module, comprising providing a solid state planar membrane;

injection moulding a potting material into one or more potting frames for supporting said membrane;

assembling, preferably by hot pressing, the one or more potting frames with the solid state planar membrane, thereby forming a membrane frame;

optionally providing a spacer at least at one side of the planar membrane; and joining a stack of said membrane frames in a gastight manner to form a planar membrane module, said joining comprising welding of potting material.

In a further aspect, the invention is directed to a method for preparing a planar membrane module, comprising providing a solid state planar membrane;

optionally placing a spacer at least at one side of the planar membrane and attaching said spacer onto said planar membrane at the periphery of said planar membrane by hot pressing, thereby forming a sub-assembly of spacer and planar membrane;

injection moulding a potting around said planar membrane or around said sub-assembly of spacer and planar membrane, thereby forming a membrane frame; and joining a stack of said membrane frames in a gastight manner to form a planar membrane module, said joining comprising fusion of adjacent membrane frames by welding of potting material.

Figure 1:
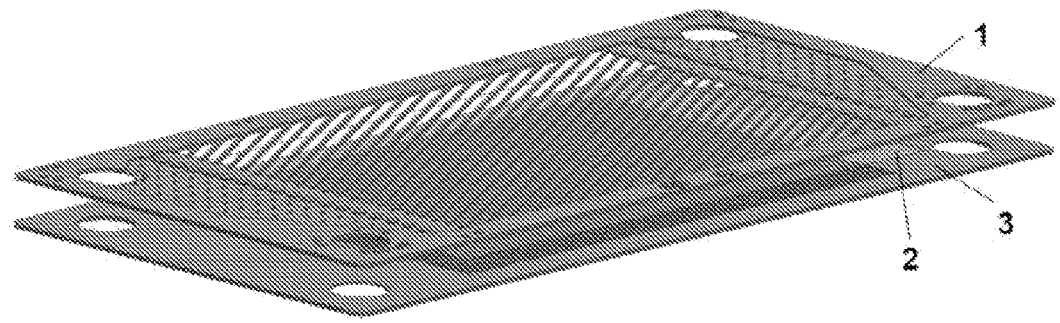
FIG. 1A is a perspective view of an embodiment of a planar membrane module.
FIG. 1B is a perspective view of another embodiment of a planar membrane module.
Figure 1:
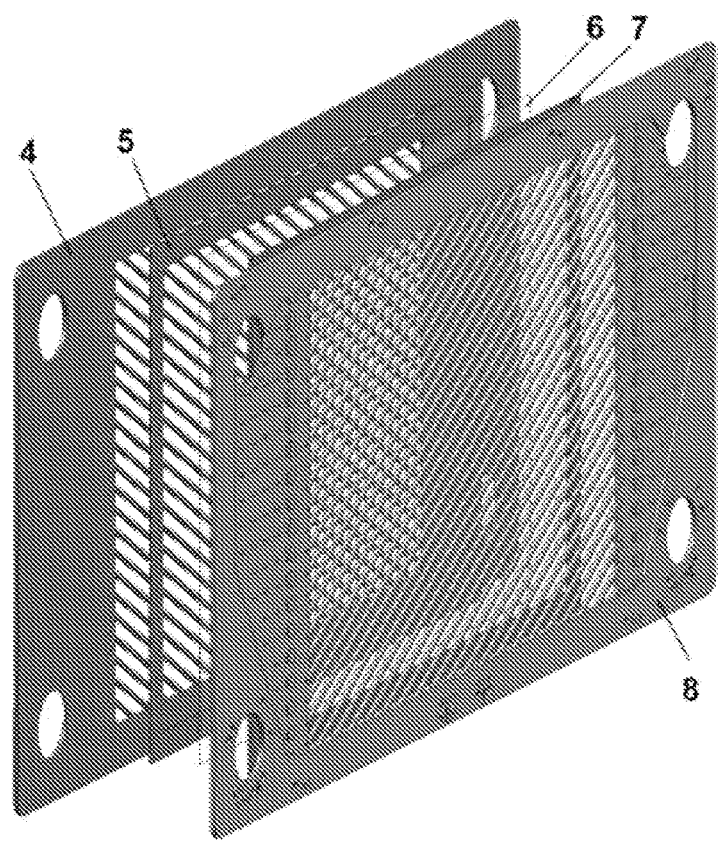

The process of the invention advantageously yields a membrane module that, by selection of feasible thermoplastic materials for the different components, is chemically stable and is suitable for use up to relatively high operating temperatures (such as temperatures of up to 90° C., 150° C. or even higher). At the same time, the invention allows designing membrane modules that can be used at higher pressure differences during operation. In addition, the approach of the invention using planar membranes allows a wide materials choice, and thereby a broad field of applications. Furthermore, by using simple processing steps, the production costs remain low and the production speed can be high. Another advantage is that the present invention allows the production of different sizes of modules depending on the application, for example small size membrane modules (such as 0.1-10 m$^2$ per module, preferably 0.5-5 m$^2$), medium size membrane modules (such as 10-200 m$^2$, preferably 50-100 m$^2$ per module), and large size membrane modules (>200 m$^2$ per module, such as 500-1000 m$^2$ per module).

Furthermore, the invention advantageously allows the production of membrane modules, wherein only plastic materials are in contact with process flows. Hence, corrosion of corrosion sensitive materials caused by contact with liquids and/or gasses can advantageously be avoided. Therefore, the invention allows the production of highly corrosion resistant membrane modules that find application e.g. in the field of treatment of salt water streams and/or brines, and in other applications where corrosion plays an important role. Advantageously, in accordance with the invention, sensitive or weak points resulting from fixation by glues, screws etc. are minimised, thereby prolonging the lifetime of the membrane module.

The type of solid state planar membrane used in accordance with the method of the invention is not limiting and strongly depends on the application for which the planar membrane module is to be used. The membrane can e.g. be microporous, homogeneous, asymmetric, electrically charged, and optionally surface treated. It is also possible that one or more additional layers are applied to the membrane, e.g. for mechanical support.

Examples of materials used in planar membranes include fluor polymers (such as polytetrafluoroethylene), polypropylene, polyphenylene oxide, polysulphone, sulphonated poly ether ether ketone, poly ether sulphone, ion selective membranes (i.e. cation or anion permeable membranes), and so-called bipolar membranes. The membrane used in accordance with the method of the invention can suitably comprise one or more of these materials. Advantageously, these materials can have relatively high chemical and/or thermal resistance.

Depending on the application, the planar membrane can be subjected to a suitable pre-treatment. Such pre-treatments can for example include impregnation of the membrane pores, coating of the membrane surface, and/or etching of the membrane surface. For example, a hydrophilic membrane surface can be rendered hydrophobic by impregnating the membrane pores with a hydrophobic agent.

The planar membrane to be used in accordance with the invention can be porous or non-porous. Porous membranes can have widely varying pore sizes. The average pore size of the planar membrane is usually smaller than 300 μm, such as 0.02-0.05 μm (in particular for liquid/liquid (component) separation or pertraction), 0.05-0.2 μm (in particular for membrane distillation), or 100-200 μm. It is even possible to use a planar membrane that has an average pore size of less than 0.01 μm, e.g. membranes that are porous for ions such as used in electrochemistry. Average pore sizes can be measured according to the bubble point method specified in ASTM F-316-80 (Fischer et al. "Eine Methode zur Ermittlung der Porengrössenverteilung" in *Messtechnik* 1968, 76(12)).

Furthermore, various membrane thicknesses can be applied. Normally the membrane will not have a thickness exceeding 500 μm, preferably the membrane thickness will be 150 μm or less, such as 100 μm or less. If the membrane is too thick, then mass transfer through the membrane will be slow and the overall process time of separation will increase. The membrane thickness will usually have a thickness of at least 10 μm in order to possess sufficient mechanical strength.

It is not required that the planar membranes in the membrane module each have the same thickness and are all composed of the same material. It is possible to combine two or more different membranes in one membrane module. For example in electro dialysis, the membrane module can comprise cation and anion membranes, or the membrane module can comprise cation, anion and bipolar membranes.

Apart from planar membranes, optional spacers and potting, further components may be included in the membrane module. It is, for instance, possible to include one or more foils in the membrane module. Apart from plastics materials, the foil can comprise materials that are sensitive to corrosion. Nevertheless, the top layer of the optional foil that is in contact with the process flows is made of a non-corrosive material. For example, in membrane distillation a polymer foil is introduced to transfer condensation heat from the distillate to the cold feed water. Hot feed water is then separated from the distillate by the membrane, through which the water vapour is transported.

In a special embodiment of the method of the invention, the solid state planar membrane is substituted for a foil with a surface of non-corrosive material. The method then no longer results in a membrane module, but yields a heat exchanging module. The foil can for example be a plastic foil, or a foil having a central layer that can be sensitive to corrosion, but which is laminated on both sides with one or more plastic materials that are non-corrosive.

Further, a foil can be applied on one or both sides (preferably both sides) of the membrane in order to protect the membrane from damaging by the spacer, e.g. during hot pressing of the membrane and the spacer, or due to piercing by a loose spacer which is applied into the membrane frame in a later stage. The optional foil is preferably applied only at the periphery of the membrane and extends slightly over the membrane rim to the center of the membrane. Thus, the foil preferably has the shape of a frame or window, leaving the centre of the membrane uncovered. This allows effective protection of the membrane during assembling of the membrane frame. Hence, the bare membrane is protected when the optional spacer is applied.

Optionally, the membrane may be mechanically supported by a supporting layer or carrier.

In accordance with the invention, at least one spacer is optionally provided between each two membranes. These spacers can be used for consolidation, cell thickness and/or flow control. The spacer which is optionally placed at least at one side of the membrane can be chosen depending on the specific application. The spacer ensures that there is no contact between different planar membranes in the membrane module and that facilitates transportations of fluids to and from the membranes in the membrane module. A wide range of spacers for membrane modules are known in the art. A plastic spacer can be produced by extrusion and injection moulding. The more common plastic materials are polyethylene, polypropylene, polyester, polyvinylidene fluoride, ethylene chlorotrifluoroethylene copolymer and polyamide. However, almost all plastic materials can be applied and some of the elastomer types.

The spacer can have various shapes. Usually, the spacer is in the form of a grid or grating. However, other forms of spacer can be used as well, such as so-called non-wovens. The number and type of spacers used between each membrane can vary. A single spacer can be used, but also a multitude of (similar or different) spacers can be applied between each membrane such as two, three or four spacers. It is not required that the spacers in the membrane module each have the same thickness and shape, and are composed of the same material.

It is possible to not use a spacer in at least one of the compartments in the membrane module.

In an embodiment of the invention, the spacer is injection moulded together with the potting material so that the potting and the spacer are produced as one part. The spacer can, for example, be injection moulded together with the potting material into one or more potting frames. In this embodiment advantageously avoids the need for fixing the spacer onto the potting or membrane.

The thickness of each spacer can independently be 0.1 mm or more. Depending on the application, the thickness of each spacer can independently be 20 mm or less. Normally, each spacer will independently have a thickness in the range of 0.1-10 mm, such as in the range of 0.1-1 mm, 1-5 mm or 5-10 mm.

In accordance with a first aspect of the invention, a potting material is first injection moulded into one or more potting frames for supporting the membrane. The injection moulding process and the potting material used can be the same as described above. It is preferred to prepare two potting frames in between which the solid state planar membrane can be assembled (these two potting frames do not necessarily have the same shape and/or dimensions).

In a subsequent step, the one or more injection moulded potting frames are assembled with the solid state planar membrane to form a membrane frame. As mentioned above, the membrane frame preferably comprises a membrane (optionally supported by a supporting layer or carrier) sandwiched between two potting frames. Assembling the membrane frame is preferably performed by hot pressing as described herein. For instance, the solid state planar membrane sandwiched between two potting frames can be assembled by hot pressing to form the membrane frame.

It is, however, also possible to injection mould one or more potting frames and assemble the one or more potting frame with the solid state planar membrane using a foil frame or window. As explained above, such a foil frame or window covers the periphery of the membrane, but leaves the centre of the membrane uncovered. In such embodiment, the foil frame or window is placed on one or both sides of the membrane, and the sub-assembly of membrane with one or more foil frames or windows is then assembled with the one or more potting frames, e.g. by placing the sub-assembly on one potting frame or by placing the sub-assembly between two potting frames, thus forming a membrane frame. Again, this assembly is preferably performed by hot pressing.

Optionally, a spacer can be provided at least at one side of the planar membrane. In an embodiment, this is realised by placing the spacer in the membrane frame after preparing the membrane frame, i.e. after assembly of the one or more potting frames with the solid state planar membrane. In another preferred embodiment, this is realised by injection moulding the spacer together with the potting material into the one or more potting frames, i.e. before assembling the one or more potting frames with the solid state planar membrane. An example of a potting frame wherein the spacer is injection moulded together with the potting material into a potting frame is shown in FIG. 1A. In this Figure, a membrane 2 is sandwiched between an injection moulded potting frame 1 and an injection moulded potting frame 3. This embodiment is highly advantageous, because there is no longer an interface between potting material and spacer material. Furthermore, it is noted that the choice of spacers that are commercially abundantly available is limited. However, by injection moulding the spacer material together with the potting material into a potting frame, a wide range of desirable spacer materials can be selected depending on the envisaged application. It is also possible to use a separately injection moulded spacer. FIG. 1B shows a similar embodiment, wherein a membrane 6 is assembled with a potting frame 4 and 8 using a foil frame or window 5 and 7 to form a membrane frame.

In accordance with a second aspect of the invention, after having placed one or more spacers on one or both sides of the planar membrane, or a spacer between two membranes, the spacer(s) and the membrane(s) are hot-pressed at the periphery of the planar membrane. The term "hot-pressing" as used in this application is meant to refer to any operation involving pressure and heating which provides sufficient forces and temperature, for example IR radiation in combination with pressing or ultrasonic welding, to attach the spacer onto the membrane, or to attach the membrane to the one or more potting frames. During the hot-pressing step the spacer material is pressed onto the membrane, and preferably forms a periphery that substantially does not have openings through which moulding material can flow during the injection moulding step. During hot-pressing, the planar membrane is usually fixed to the spacer material, thereby forming a sub-assembly of spacer and planar membrane, which can be further processed. A pre-treatment of the membrane (such as etching, dipping, or irradiation) can be applied to achieve a better bonding of the membrane to the spacer.

Hot-pressing the spacer membrane combination normally involves temperatures in the range of 100-200° C. when spacer materials such as polyethylene and/or polypropylene are involved, and pressures of 2-40 bar, preferably of 5-20 bar. When materials such as polyamide, polyvinylidene fluoride, ethylene chlorotrifluoroethylene copolymer and/or poly ether ether ketone are involved, usually temperatures in the range of 200-400° C., and pressures in the range of 2-40 bar are applied. Temperatures close to the melting temperature of the membrane may lead to damaging and/or perforation of the membrane and are therefore not preferred. The exact temperature and pressure to be used depends on the membrane and spacer material.

In a step thereafter, a potting is injection moulded around the planar membrane or around the sub-assembly of spacer and planar membrane, thereby forming a membrane frame. The potting can comprise a variety of different materials. However, good results have been achieved with e.g. polypropylene, polyethylene, and/or polyfluoropolymers that are compatible with injection moulding (such as perfluoralkoxy copolymer, ethylene-tetrafluoroethylene copolymer, and fluorinated ethylene propylene copolymer, polyvinylidene fluoride and modified polytetrafluorethylene.

Injection moulding is a relatively cheap technique which allows the easy production of membrane frames and is a relatively cheap technique for large series. By hot-pressing the optional spacer onto the membrane, a sub-assembly is formed prior to injection moulding in which the periphery substantially does not have openings. Advantageously, this allows to injection mould the potting without having moulding material run into the spacer/membrane sub-assembly. For example, an injection mould equipped with a pinch edge can then be applied to cut off any flow openings. It is further possible to injection mould a spacer together with the potting. In this manner a spacer can for instance be injection moulded directly against the planar membrane, thereby making the step of hot-pressing a spacer onto the planar membrane superfluous.

In accordance with both the first and second aspect of the invention, the planar membrane module of the invention can be prepared by stacking a multitude of membrane frames on top of each other. Each frame can have identical external dimensions. However, a membrane module according to the invention can also comprise two or more different frames with respect to e.g. dimensions or chemical properties. For example, one or more membrane frames in the planar membrane module may be provided with a spacer, while other membrane frames in the membrane module are not provided with a spacer. By providing the frames with holes and aligning these holes with one another, passages can be formed for the common supply of e.g. the feed, discharge, permeate, product and/or retentate. In a preferred embodiment, the membrane frames (which do not necessarily have the same shape and/or dimensions) are stacked in alternating mirror wise fashion, such that the fluid at each side of a membrane will flow in reverse directions.

After two or more membrane frames have been placed on top of one another, the stack is joined by welding (which involves melting of) potting material, in particular thermal welding of potting material. The joint between the different membrane frames should be gastight. Joining can for instance be performed by wire welding, according to which a metallic wire is provided between the frames. Upon heating the wire (by temporarily applying an electrical current through the wire), the potting material of the different membrane frames melts and the membrane frames can be interconnected, preferably while pressing the frames together. After cooling, the potting material solidifies, thereby joining the different membrane frames. It is also possible to join two frames at a time by hot pressure welding. Such pressure welding can be performed at very specific locations of the membrane frames, thereby allowing a precise joint. Furthermore, it is possible to join different membrane frames by melting potting material using infrared radiation after which the membrane frames can be pressed against one another. Also ultrasonic welding, mirror-welding, and the like may be used. Combinations of different joining techniques involving melting of the potting material can be used as well.

In accordance with the invention, it is preferred that the material of the optional spacer and the potting have melting points that are similar. It is preferred that the melting point of the membrane material equals or exceeds the melting point of the optional spacer material and the potting material. In this manner, the invention advantageously allows preparing e.g. a membrane module having polytetrafluorethylene membranes and a polypropylene potting, a polypropylene membrane with a polypropylene potting, or a polytetrafluorethylene membrane with a perfluoralkoxy copolymer potting. In case the optional spacer is to be attached to the membrane by hot pressing, it is preferred that the melting temperature of the spacer material and the potting material are close to one another. Variations are preferably kept within a range of 20° C. In the embodiment where the spacer is injection moulded together with the potting material, the potting material and the spacer material are the same.

Figure 2:
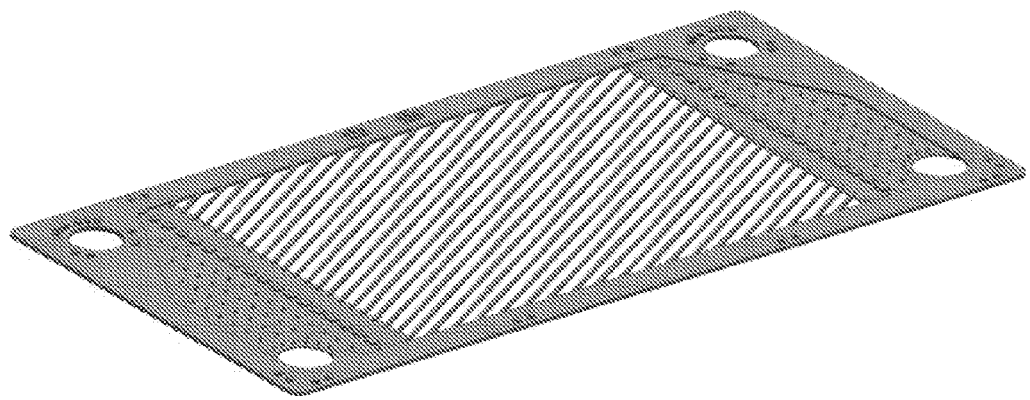
FIG. 2A is a perspective view of an embodiment of a potting frame.
FIG. 2B is a perspective view of an embodiment of stacked and counter-current potting frames.
FIG. 2C is a perspective view of an embodiment of a planar membrane module coupled to further equipment.
Figure 2:
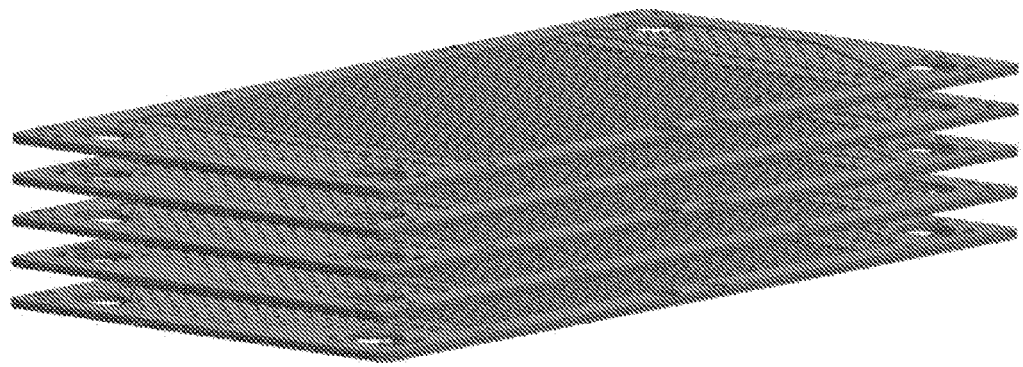
Figure 2:
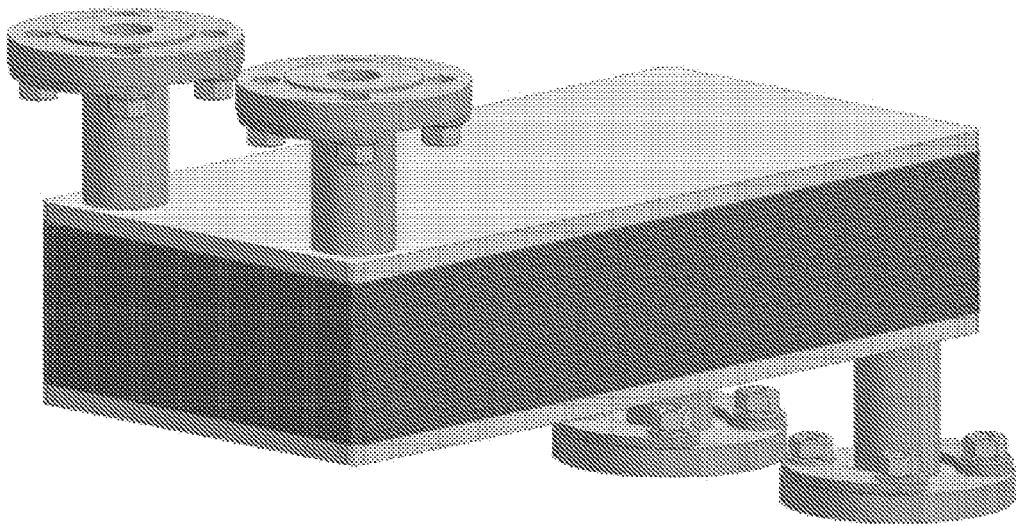

The method of the invention is further illustrated by means of the schematic pictures in FIG. 2. A possible form of a potting frame is depicted in FIG. 2A. Holes in the membrane frame allow supply of e.g. feed, discharge, permeate and/or retentate. Joining a stack of membrane frames in alternating mirror wise fashion yields an advantageous counter-current design as shown in FIG. 2B. The provision of holes in the membrane frames and housing for supply of e.g. feed, discharge, permeate and/or retentate allows for simple coupling of the membrane system to further equipment, FIG. 2C.

Advantageously, the resulting planar membrane module does not require any O-rings, screws, bolts, adhesives, or other additional elements to combine the different membrane frames into a membrane module. This is highly advantageous, because such additional elements are usually weak points or potential causes for premature leakage of the final membrane module.

In a further aspect therefore, the invention is directed to a planar membrane module obtainable by the process according to the invention. In a preferred embodiment, the membrane module of the invention is free from O-rings, screws, bolts, and adhesives. The planar membrane module obtainable by the process of the invention can be cased in an external frame using conventional techniques. This external frame improves the mechanical properties of the membrane module and can for instance assist in absorbing pressures during operation.

In an embodiment, the membrane module of the invention consists of plastic materials, i.e. all parts and materials in contact with process fluids (liquids and/or gases) inside the module do not contain corrosion sensitive materials, such as metals. Such a membrane module is highly corrosion resistant.

The membrane module of the invention can be applied in a wide variety of applications. The membrane module can be used for membrane processes of liquid/liquid systems, gas/gas systems, as well as liquid/gas systems. Some examples of applications include the extraction of an organic phase/component from waste water, gas adsorption, and membrane distillation. Applications can widely range in scale from large scale (in the order of 100 000-500 000 $m^2$ membrane surface or larger) to middle scale (in the order of 100-10 000 $m^2$ membrane surface) and also small scale installations in the order of 0.1-10 $m^2$ of membrane area, for e.g. where applications are decentralised.

The membrane module (depending on the materials used) can be used at operating temperatures of up to 80° C., 120° C., 150° C. or even higher. Normally, the membrane module will not be operated at temperatures below 5° C. In addition, due to the high quality welding joints between the different membrane frames in the membrane module it is possible to deal with considerable pressure differences. This is of importance, because during operation, the pressure differences at specific locations of the membrane module can reach a value of for instance about 1-2 bar. Normally this pressure difference will not exceed 4 bar, preferably the pressure is 3 bar or less.

The invention will now be illustrated by means of the following Example.

EXAMPLE

A polypropylene potting frame was made by injection moulding. This injection moulded potting frame had an integrated spacer structure injection moulded directly within the frame. A second potting frame was injection moulded similar to the first frame Between both injection moulded potting frames a PTFE (polytetrafluorethylene) membrane sheet was placed.

A sub-assembly (membrane frame) was made by hot pressing the PTFE membrane sheet together with the injection moulded potting frames on the edges of the membrane surface to be used, at a temperature of 165° C. and 10 bar A conductive wire, a metal wire of 1 mm diameter, was placed around the fluid pockets and periphery of the first membrane frame. A second membrane frame was placed on top of the first membrane frame such that a counter-current-flow was created on two sides of each membrane.

The conductive wire was heated by an electric current in the range of 30 V and 8 A, for a period long enough to locally melt the polypropylene of the membrane frame. When the polypropylene was melted the electric current was stopped and the two membrane fames were pressed together until the polypropylene cooled down below 100° C.

Larger membrane areas can be created by putting more membrane frames on top of one another in a way as described above.

In order to finish the membrane unit an end plate with an inlet and an outlet for a first fluid was placed on one side and an end plate with an inlet and an outlet for a second fluid was placed on the other end. Both end plates were welded with a conductive wire as mentioned above.

EXAMPLE 2

Two polypropylene frames, typical thickness 0.5 mm, are hot pressed on both sides at the periphery of a PTFE membrane sheet. This membrane with the two hot pressed frames is placed in a mould for injection moulding a membrane frame without a spacer. By injection moulding the polypropylene membrane frame, the injection moulded polypropylene melts the hot pressed frames in a way that both are melted together. In this way a membrane frame is formed.

A separate injection moulded spacer or commercially available spacer was placed on the membrane frame.

A conductive wire, a metal wire of 1 mm diameter, was placed around the fluid pockets and periphery of the first membrane frame. A second membrane frame was placed on top of the first membrane frame such that a counter-current-flow was created on two sides of each membrane.

The conductive wire was heated by an electric current in the range of 30 V and 8 A, for a period long enough to locally melt the polypropylene of the membrane frame. When the polypropylene was melted the electric current was stopped and the two membrane fames were pressed together until the polypropylene cooled down below 100° C.

Larger membrane areas can be created by putting more membrane frames on top of one another in a way as described above.

In order to finish the membrane unit, an end plate with an inlet and an outlet for a first fluid was placed on one side and an end plate with an inlet and an outlet for a second fluid was placed on the other end. Both end plates were welded with a conductive wire as mentioned above.

The invention claimed is:

1. Method for preparing a planar membrane module, comprising
    providing a solid state planar membrane;
    injection moulding a potting material into one or more potting frames for supporting said membrane;
    in a subsequent step, assembling, the one or more injection moulded potting frames with the solid state planar membrane, thereby forming a membrane frame; wherein said assembling of the one or more potting frames with the solid state planar membrane comprises the use of a foil frame comprising a plastics material, wherein said foil frame covers the periphery of the membrane and leaves the centre of the membrane uncovered, wherein a foil frame is placed at one or both sides of the membrane, and wherein a sub-assembly of a membrane with one or more foil frames is assembled with one or more potting frames; and
    joining a stack of said membrane frames in a gastight manner to form a planar membrane module, said joining comprising welding of potting material of the membrane frames.

2. Method according to claim 1, further comprising providing a spacer at least at one side of the planar membrane, wherein said spacer is injection moulded together with the potting material into said potting frame.

3. Method according to claim 1, further comprising providing a spacer at least at one side of the planar membrane, wherein said spacer is placed into said membrane frame after assembly of the one or more potting frames with the solid state planar membrane.

4. Method according to claim 1, wherein said planar membrane is subjected to a pre-treatment, comprising impregnation, coating and/or etching.

5. Method according to claim 1, wherein the melting point of the membrane material equals or exceeds the melting point of the potting material and an optional spacer material.

6. Method according to claim 1, wherein
    said solid state membrane is porous and has an average pore size in the range of 0.01-300 μm, in the range of 0.02-0.05 μm, in the range of 0.1-0.2 μm, or in the range of 100-200 μm, or
    wherein said solid state membrane is non-porous.

7. Method according to claim 1, wherein said assembling comprises hot pressing, wherein said hot pressing comprises applying a temperature of 100-400° C. and a pressure of 2-40 bar.

8. Method according to claim 1, wherein said potting material comprises injection moulding compatible plastics, including polyolefin and/or injection moulding compatible fluor polymers.

9. Method according to claim 1, wherein said welding comprises wire welding, infrared welding, ultrasonic welding, mirror welding and/or pressure welding.

10. Planar membrane module obtainable by a process according to claim 1.

11. Planar membrane module according to claim 10, wherein said membrane module is free from O-rings, screws, bolts, and adhesives in contact with any process gasses and/or liquids.

12. Method according to claim 1, wherein the assembling comprises attaching the one or more injection moulded potting frames to the solid state planar membrane by hot pressing.

13. Method according to claim 1, wherein in the assembling the solid state planar membrane is sandwiched between at least two of the injection moulded potting frames.

14. Method for preparing a planar membrane module, comprising
    providing a solid state planar membrane;
    placing a spacer at least at one side of the planar membrane and attaching said spacer onto said planar membrane at the periphery of said planar membrane by hot pressing, thereby forming a sub-assembly of spacer and planar membrane;
    injection moulding a potting around said sub-assembly of spacer and planar membrane, thereby forming a membrane frame; and
    joining a stack of said membrane frames in a gastight manner to form a planar membrane module, said joining comprising welding of potting material of said membrane frames.

15. Method according to claim 14, wherein said attaching is such that thereafter the periphery of the sub-assembly of spacer and planar membrane substantially does not have openings through which moulding material can flow during the injection moulding step.

16. Method according to claim 14, wherein said planar membrane is subjected to a pre-treatment, comprising impregnation, coating and/or etching.

17. Method according to claim 14, wherein the melting point of the membrane material equals or exceeds the melting point of the potting material and an optional spacer material.

18. Method according to claim 14, wherein
said solid state membrane is porous and has an average pore size in the range of 0.01-300 μm, in the range of 0.02-0.05 μm, in the range of 0.1-0.2 μm, or in the range of 100-200 μm, or
wherein said solid state membrane is non-porous.

19. Planar membrane module obtainable by a process according to claim 14.

* * * * *